(12) United States Patent
Dejean et al.

(10) Patent No.: US 7,991,709 B2
(45) Date of Patent: Aug. 2, 2011

(54) METHOD AND APPARATUS FOR STRUCTURING DOCUMENTS UTILIZING RECOGNITION OF AN ORDERED SEQUENCE OF IDENTIFIERS

(75) Inventors: Herve Dejean, Grenoble (FR); Jean-Luc Meunier, Saint Nazaire les Eymes (FR)

(73) Assignee: Xerox Corporation, Norwalk, CT (US)

( * ) Notice: Subject to any disclaimer, the term of this patent is extended or adjusted under 35 U.S.C. 154(b) by 857 days.

(21) Appl. No.: 12/020,743

(22) Filed: Jan. 28, 2008

(65) Prior Publication Data
US 2009/0192956 A1 Jul. 30, 2009

(51) Int. Cl.
G06F 15/18 (2006.01)
G06F 17/21 (2006.01)
G06F 17/22 (2006.01)
G06F 17/27 (2006.01)

(52) U.S. Cl. .......... 706/12; 715/230; 715/231; 715/234; 715/239; 715/254

(58) Field of Classification Search .............. 706/12
See application file for complete search history.

(56) References Cited

U.S. PATENT DOCUMENTS

| | | | |
|---|---|---|---|
| 5,884,037 A * | 3/1999 | Aras et al. ............ | 709/226 |
| 2004/0006742 A1 | 1/2004 | Slocombe | |
| 2006/0101058 A1 | 5/2006 | Chidlovskii | |
| 2006/0155700 A1 | 7/2006 | Dejean et al. | |
| 2006/0248070 A1 | 11/2006 | Dejean et al. | |
| 2007/0196015 A1 | 8/2007 | Meunier et al. | |
| 2007/0198912 A1 | 8/2007 | Meunier | |

OTHER PUBLICATIONS

Zeni et al., "A Lightweight Approach to Semantic Annotation of Research Papers" [online], 2007 [retrieved on Mar. 1, 2011]. Retrieved from the Internet:<http://www.springerlink.com/content/p7246128t5542467/>.*
Hassan, "PDF to HTML Conversion" [online], 2003 [retrieved on Mar. 3, 2011]. Retrieved from the Internet:<http://www.dbai.tuwien.ac.at/staff/hassan/pdf2html/final.pdf>.*
Chen et al. (Chen), "Detecting Web Page Structure for Adaptive Viewing on Small Form Factor Devices" [online], 2003 [retrieved on Mar. 1, 2011]. Retrieved from the Internet:<http://citeseerx.ist.psu.edu/viewdoc/download?doi=10.1.1.92.3419&rep=rep1&type=pdf>.*
Evans, "Algorithms and Complexity for Annotated Sequence Analysis" [online], 1999 [retrieved on Mar. 5, 2011]. Retrieved from the Internet:<http://eref.uqu.edu.sa/files/algorithms_and_complexity_for_annotated_785528.pdf>.*
U.S. Appl. No. 11/599,947, filed Nov. 15, 2006, Dejean, et al.

* cited by examiner

Primary Examiner — Jeffrey A Gaffin
Assistant Examiner — Nathan H Brown, Jr.
(74) Attorney, Agent, or Firm — Fay Sharpe LLP (57) ABSTRACT

A method is provided for operating a computing device to create a document structure model of a computer parsable text document utilizing recognition of at least one ordered sequence of identifiers in the document. The method includes converting a computer parsable text document of any format to an alternative structured language format to form a converted document. The text of the converted document is fragmented into an ordered sequence of text fragments within a text format. The text fragments are enumerated to obtain a sequence of terms. At least one optimal sub-sequence of terms is identified from among the sequence of terms, with an optimal sub-sequence being one or more longest increasing sub-sequence(s). The computer parsable text document is annotated with tags, with the tags including information derived from identification of the optimal sub-sequence(s). The annotated document is displayed on the graphical user interface.

25 Claims, 6 Drawing Sheets

SECTION 01 31 19 — 110
PROJECT MEETINGS

PART 3 EXECUTION

Not Used

<u>SECTION 01 70 00</u> ← 410

<u>EXECUTION AND CLOSEOUT REQUIREMENTS</u>

PART 1  GENERAL 1.1   SECTION INCLUDES

A. Closeout Procedures

B. Final Cleaning

C. Project Record Documents

Division 01-20            Renovate Building 79, College of Engineering, ISU

METHOD AND APPARATUS FOR STRUCTURING DOCUMENTS UTILIZING RECOGNITION OF AN ORDERED SEQUENCE OF IDENTIFIERS

CROSS-REFERENCE TO RELATED APPLICATIONS

The following co-pending applications, U.S. application Ser. No. 11/599,947, filed Nov. 15, 2006, titled "Versatile Page Number Detector"; U.S. application Ser. No. 11/360,951, filed Feb. 23, 2006, titled "Rapid Similarity Links Computation for Table of Contents Determination"; U.S. application Ser. No. 11/360,963, filed Feb. 23, 2006, titled "Table of Contents Extraction with Improved Robustness"; U.S. application Ser. No. 11/116,100, filed Apr. 27, 2005, titled "Structuring Document Based on Table of Contents" are assigned to the same assignee of the present application. The entire disclosures of these co-pending applications are totally incorporated herein by reference in their entireties.

BACKGROUND AND SUMMARY

This disclosure relates generally to the information storage and processing arts. It finds particular application in conjunction with the conversion of documents available in print-ready or image format into a structured format that reflects the logical structure of the document through the recognition of ordered sequences of identifiers in a document.

Many companies and organizations are desirous of converting data and documents originally drafted in an unstructured form (legacy documents) into a structured format to facilitate storage of the documents, reusing or repurposing parts of the documents, providing document uniformity across a database of stored information, and access to content within the documents. The unstructured documents may exist in various page description language formats, such as Adobe's portable document format (PDF), PostScript, PCL-5, PCL-5E, PCL-6, PCL-XL, and the like. The converted structured documents may employ a markup language such as extensible markup language (XML), standard generalized markup language (SGML), and hypertext markup language (HTML), among others. Technical manuals, user manuals, and other proprietary reference documents are common candidates for such legacy conversions.

In structured documents, content is organized into delineated sections such as document pages with suitable headers/footers and so forth. Such organization typically is implemented using markup tags. In some structured document formats, such as XML, a document type definition (DTD) or similar document portion provides overall information about the document, such as an identification of the sections, and facilitates complex document structures such as nested sections.

A particular issue that arises during the conversion process is associated with classes of documents containing normalized identifiers. Normalized identifiers are associated with specific document elements, often corresponding to logical parts of a document. The identification of these sequences of identifiers allows collection of useful information about these parts of the document. An example of normalized identifiers are the CSI numbers defined in the Construction Specifications Institute's industry standard, the CSI's MasterFormat™ (http://www.csinet.org/masterformat). This standard is the specifications-writing standard for most commercial building design and construction projects in North America. It lists titles and section numbers for organizing data about construction requirements, products, and activities. For example, 081323 refers to "bronze doors". More generally, this numbering technique is used for many document types and with generic document elements such as 'chapter'.

For the purposes of document conversion, it is necessary both to detect normalized identifiers and to recognize the part of the document that describes the associated object. The primary difficulty associated with detection of normalized identifiers is that they may also be used in other situations, such as referencing a certain object, in which case they may appear almost anywhere in the document, or they may be present in the part of the document that describes the given object. Additionally, there may be variations of style within the same document, when the latter is obtained by composing parts of different documents. This may arise in industry when multiple different providers author a product maintenance manual. These difficulties are illustrated in FIGS. 1 through 4.

Figure 1:
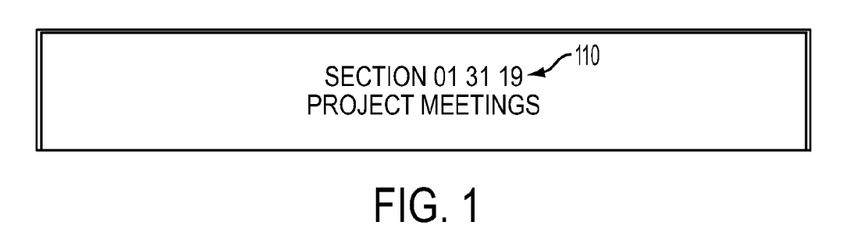
FIG. 1 illustrates one example of the appearance of a normalized identifier occurring at the top of a page in a document.
Figure 2:
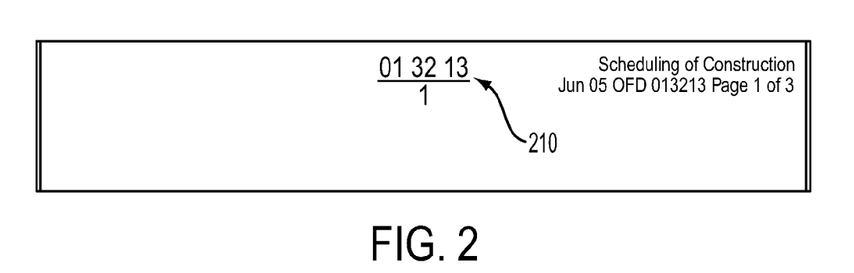
FIG. 2 illustrates one example of the appearance of a normalized identifier occurring in the footer area of a page.
Figure 3:
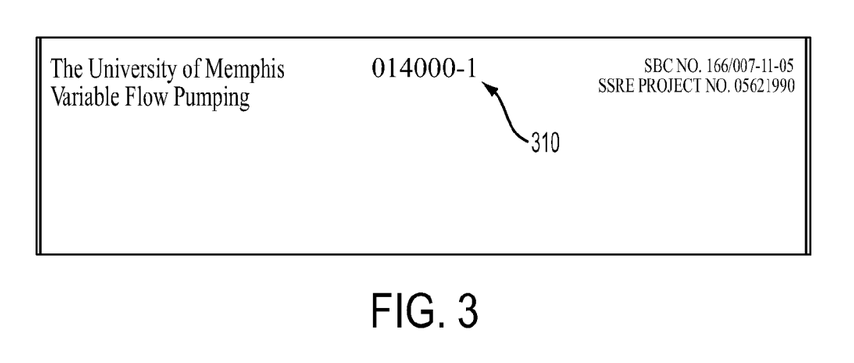
FIG. 3 illustrates another example of the appearance of a normalized identifier occurring in the footer area of a page.
Figure 4:
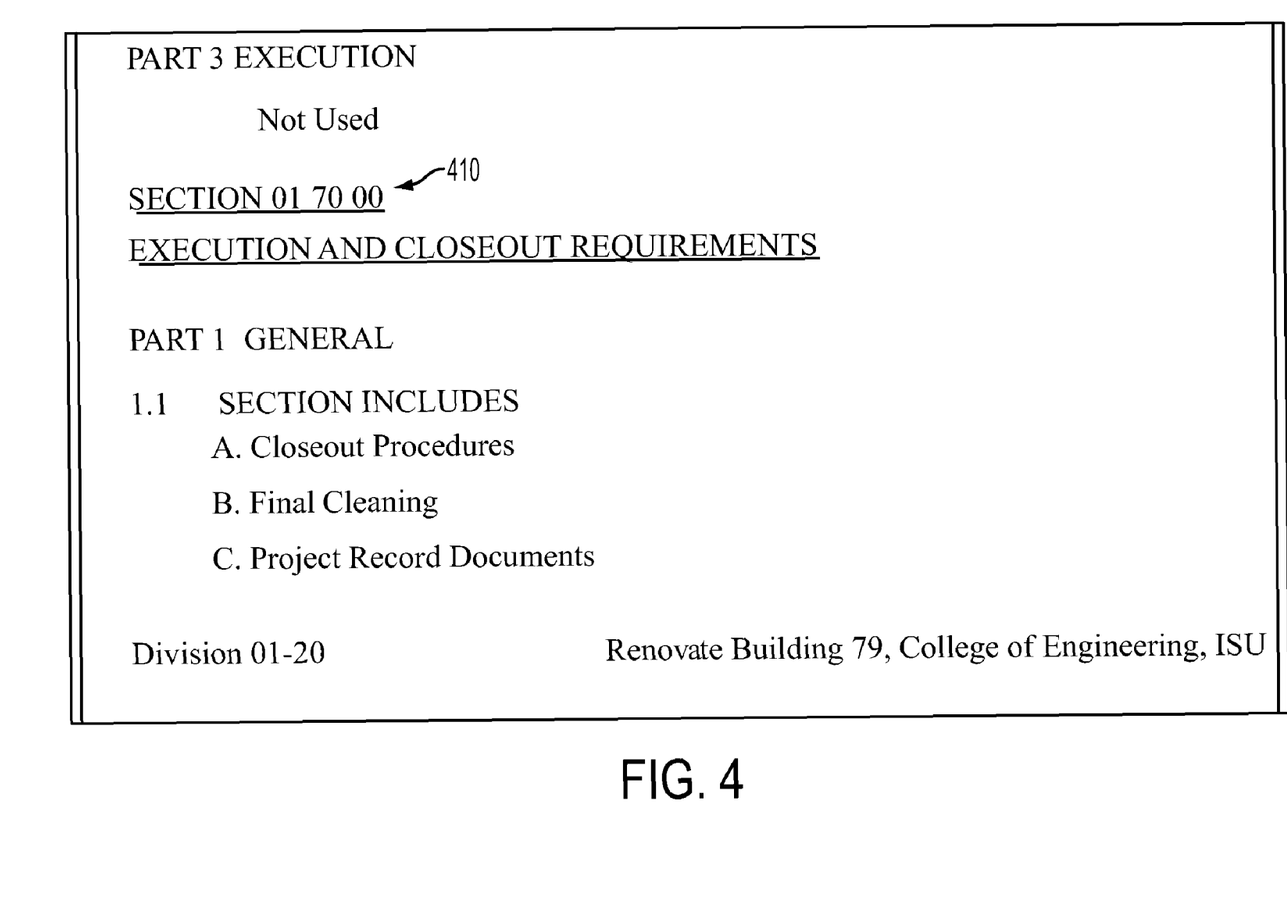
FIG. 4 illustrates one example of the appearance of a normalized identifier occurring in the text area of a page.

The examples illustrated in FIGS. 1-3 occur in the same document. Turning to FIG. 1, the CSI number 110 is a six-digit number (in this case 01 31 19) found at the top of the page, above the CSI title, following the term "Section". In FIG. 2, the six-digit CSI number (01 32 13) identified as 210 is located in the page footer area above the page number and underlined. In FIG. 3, the CSI number (014000) identified as 310 is located next to the page number in the page footer area and is separated from it by a dashed line. Finally, in FIG. 4, the CSI number (01 70 00) identified as 410 occurs in the second half of a page. In this example it follows the term "Section" and is underlined. As can be observed by these examples, the positions, textual context, and typography of the numbers may vary, not only from document to document, but within a single document, as well. Additionally, the number of digits may vary, for example, if a leading 0 is omitted or if a previous version of the CSI MasterFormat is used, resulting in 5-digit numbers, following a different standard. Increasing the difficulty in detecting these identifiers, this form of numbering differs from pagination-related numbering as there is not necessarily any correlation with the pagination, as zero to many, same or different, valid numbers may appear on a given page. Also the sequence of valid identifiers may include gaps or redundancy.

Accordingly, there is a need in the art for methods and apparatuses for detecting these identifiers and identifying the parts of the document associated with them as a component in a chain of components for performing automatic conversion to XML of documents available in an unstructured format.

All U.S. patents and published U.S. patent applications cited herein are fully incorporated by reference. The following patents or publications are noted.

U.S. Patent Application Publication No. 2004/0006742 to Slocombe ("Document Structure Identifier") describes a method of automated document structure identification based on visual cues. The two dimensional layout of the document is analyzed to discern visual cues related to the structure of the document, and the text of the document is tokenized so that similarly structured elements are treated similarly. However, this application operates differently from the disclosure herein in that it first looks for lines starting with a number or a bullet.

U.S. patent application Ser. No. 11/599,947 to Dejean et al. ("Versatile Page Number Detector") describes a method for detection of page numbers in a document utilizing the sequentiality property to recognize page numbers by looking for a series of increasing sequences with a fixed increment.

The disclosed embodiments provide examples of improved solutions to the problems noted in the above Background discussion and the art cited therein. There is shown in these examples an improved method for operating a computing device to create a document structure model of a computer parsable text document utilizing recognition of at least one ordered sequence of identifiers in the document. The method includes converting a computer parsable text document of any format to an alternative structured language format to form a converted document. The text of the converted document is fragmented into an ordered sequence of text fragments within a text format. The text fragments are enumerated to obtain a sequence of terms. At least one optimal sub-sequence of terms is identified from among the sequence of terms, with an optimal sub-sequence being one or more longest increasing sub-sequence(s). The computer parsable text document is annotated with tags, with the tags including information derived from identification of the optimal sub-sequence(s). The annotated document is displayed on the graphical user interface.

In an alternate embodiment there is disclosed a system for creating a document structure model of a computer parsable text document utilizing recognition of at least one ordered sequence of identifiers in the document. The system includes a document conversion graphical user interface and a conversion processor for converting computer parsable text documents of any format to an alternative structured language format to form a converted document. A text fragmenter fragments the text of the converted document(s), breaking the converted document(s) into an ordered sequence of text fragments within a text format. An enumeration module enumerates the text fragments to obtain a sequence of terms, with each term being a matching fragment. A selection module identifies one or more optimal sub-sequence of terms, with an optimal sub-sequence defined as a longest increasing sub-sequence from among the sequence of terms. An association module annotates the computer parsable text document with tags, which include information derived from identification of the optimal sub-sequence(s).

In yet another embodiment there is disclosed a computer-readable storage medium having computer readable program code embodied in the medium which, when the program code is executed by a computer, causes the computer to perform method steps for creating a document structure model of a computer parsable text document utilizing recognition of at least one ordered sequence of identifiers in the document. The method includes navigating to a document conversion graphical user interface and converting at least one computer parsable text document of any format to an alternative structured language format to form a converted document. The text of the converted document is fragmented to break the converted document into an ordered sequence of text fragments within a text format. The text fragments are enumerated to obtain a sequence of terms, with each term comprising a matching fragment. One or more optimal sub-sequence of terms is identified, with an optimal sub-sequence defined as a longest increasing sub-sequence from among the sequence of terms. The computer parsable text document is annotated with tags, which include information derived from identification of the optimal sub-sequence(s). The annotated document is displayed on the graphical user interface.

BRIEF DESCRIPTION OF THE DRAWINGS

The foregoing and other features of the embodiments described herein will be apparent and easily understood from a further reading of the specification, claims and by reference to the accompanying drawings in which:

DETAILED DESCRIPTION

In the following detailed description, reference is made to the accompanying drawings, which form a part hereof, and in which is shown by way of illustration specific illustrative embodiments in which the invention may be practiced. These embodiments are described in sufficient detail to enable those skilled in the art to practice the invention, and it is to be understood that other embodiments may be utilized and that logical, mechanical and electrical changes may be made without departing from the scope of the disclosure. The following detailed description is, therefore, not to be taken in a limiting sense.

The method and system for recognizing normalized identifiers in a document as described herein enables automatic detection of an ordered sequence of identifiers, such as CSI numbers, in documents and identification of the related part(s) of the document. In general, the original document is in an unstructured format, which in the present case means that the text portions may include normalized identifiers but the structure of the document does not identify them as such. In converting the unstructured document to a structured digital document, the original normalized identifiers become part of the text, but are not identified as being normalized identifiers in the document structure. The exemplary system and method seek to identify the original normalized identifiers for further processing, e.g., tagging, indexing, and/or removal.

The original document may be a page description language document, such as a PDF, PostScript, PCL-5, PCL-5E, PCL-6, PCL-XL or other suitable document. In PDF, for example, portions of text and other document content, such as images, are in the form of objects which are assigned to pages of the document by a job ticket. In general, normalized identifiers may form a part of one or more of the text objects. The job ticket may be associated with the file as a file header or embedded in the document. The structured format to which the original document is converted may be any suitable markup language, such as XML, SGML, HTML, among others. XML allows the delivery of structured data in a standard, consistent way. XML is a complementary format to HTML and both are derived from the Standard Generalized Markup Language (SGML); however, unlike HTML, XML does not have a fixed vocabulary.

The system and method employ a regular expression to spot all possible identifiers and then applies a dynamic programming technique to generate the longest sub-sequence of identifiers following a non-strict monotonic increase. A binary classifier is trained on the positive and negative identifiers found during dynamic programming. This classifier takes into account the position, typography, and similar parameters to improve the quality of the result.

While for the purposes of explanation the method and system will be described as functioning within a general purpose computer or a dedicated computing device, it will be appreciated by those skilled in the art that the method and system may also be beneficially utilized in any network environment including various printing, storage, and communication devices, any of which may be employed for the purposes of document conversion. All such variations and modifications are fully contemplated by the scope of the specification and claims herein.

Various computing environments may incorporate capabilities for document conversion employing the system and method for recognizing normalized identifiers. The following discussion is intended to provide a brief, general description of suitable computing environments in which the method and system may be implemented. Although not required, the method and system will be described in the general context of computer-executable instructions, such as program modules, being executed by a single computer. Generally, program modules include routines, programs, objects, components, data structures, etc., that perform particular tasks or implement particular abstract data types. Moreover, those skilled in the art will appreciate that the method and system may be practiced with other computer system configurations, including hand-held devices, multi-processor systems, microprocessor-based or programmable consumer electronics, networked PCs, minicomputers, mainframe computers, and the like.

The method and system may also be practiced in distributed computing environments where tasks are performed by remote processing devices that are linked through a communication network. In a distributed computing environment, program modules may be located in both local and remote memory storage devices.

Figure 5:
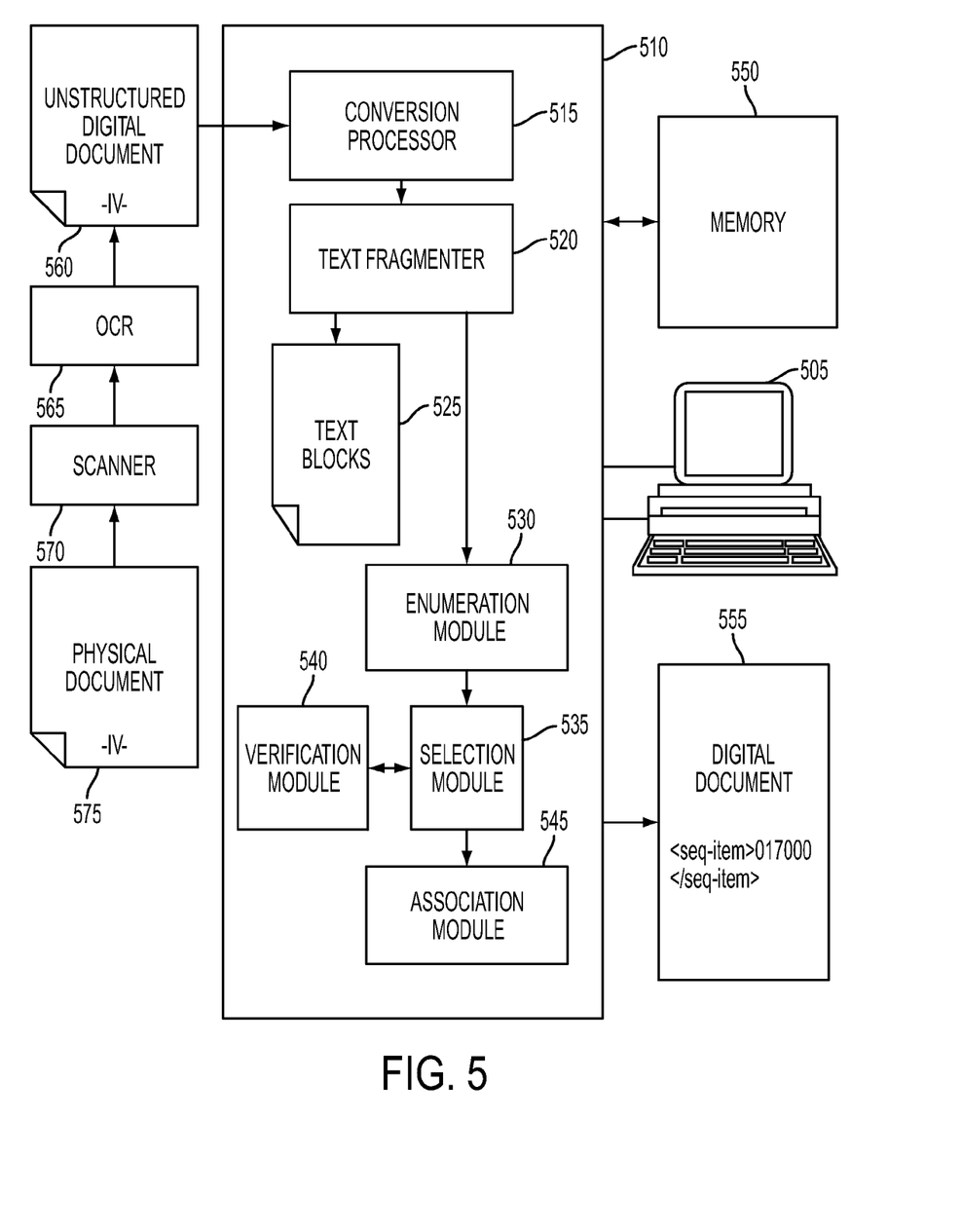
FIG. 5 is a functional block diagram of an example embodiment of an apparatus for recognition of an ordered sequence of identifiers in a document.

Referring to FIG. 5, the block diagram illustrates an example embodiment of a system that provides the capability for document conversion using recognition of normalized identifiers. Control of the system is exercised through the document conversion user interface, such as a keyboard, touch screen, cursor control device, or combination thereof, which permits interaction of a user with an individual device, such as a computer. The document conversion user interface 505 receives instructions from an operator and transmits these instructions to a processor 510, which includes a plurality of processing modules for automated processing of an input digital document.

An unstructured document 560, for example, a technical manual, user manual, or other proprietary reference document in a PDF format, is converted by conversion processor 515 into an alternative language format, such as XML or other structured format, and when in such format can be processed for various purposes as a legacy document. The conversion processor 515 may be an off-the-shelf converter which converts the input original document into a list of text strings from an XML file produced from the original document. A text fragmenter 520 breaks the converted document into an ordered sequence of text blocks 525. Depending on the nature of the document, the text fragments may be a line of text, a portion of a line, or a single word. To identify the document portions describing each object (the subject of each identifier), the fragmenter assumes that the objects are described in the document in an order induced by the identifier.

In the case of a physical document, such as a paper document 575, the document is scanned using an optical scanner 570 and is processed by an optical character recognition (OCR) processor 565 to form the digital document. For a text document, each line may become a fragment, ordered line-by-line. For an XML or HML document, text fragments may be based at the word level, where each word is generally distinguished from adjacent words by a space (words here can include one or more recognized characters of any type, including letters and/or numbers). Text fragmenter 520 may also effect a position allocation of the document text content so that the page segmentation and vertical positions per page of the text content are preserved. For plain text format, the vertical position used is a line number. For a proprietary format, the document can be converted into plain text format, or can be converted into a format where information about the vertical position exists. For example, a PDF2XML converter can provide page segmentation and positional information of the blocks of texts.

Enumeration module 530 identifies text fragments representative of a normalized identifier. To spot the desired identifiers, one or several regular expressions may be written to find the possible occurrences of the desired identifiers. A regular expression, often called a pattern, is a string that follows a defined syntax and can match a set of strings. A well-known example of a regular expression is for instance the use of the character '*' as a wildcard for file names in many file systems. This module enumerates all text fragments that contain a potential identifier and produces a sequence of terms. Selection module 535 selects among the sequence of terms, i.e. the sequence of text fragments that contain a potential identifier, a sub-sequence that forms the longest increasing sub-sequence. In other words, it selects from the sequence of terms only those that together form an increasing sequence, and for which it is not possible to select any other term without violating the increase property.

Finding the longest increasing sub-sequence is done recursively from the beginning of the ordered list to its end. An example of this process is as follows:

- A weight is associated with each term, 1 for instance
- A score function is defined for a sub-sequence, typically the sum of the weight of its terms, which in the case of a constant weight of 1 equals the length of the sub-sequence.
- A compare function is defined for any pair of terms, in order to compare two terms so as to order terms, typically the natural lexicographic order, since the identifier is probably meaningful to a user.
- A special starting term TO is inserted at the head of the sequence, with a score of 0. This term is lower than any other term by construction.

The best increasing sub-sequence can now be computed in $N*(N+1)/2$ steps, where N is the number of enumerated terms: for each term Ti ($i=1 \ldots N$), record the best achievable score and the best previous corresponding term by looking in turn at the best result achieved for each of the previous $i-1$ terms. Once this data structure has been constructed, the term with the highest score is identified and the corresponding sub-sequence is obtained by backward chaining. This procedure returns at least one of several possible best sub-sequences with respect to the chosen score function. Computation of the best increasing sub-sequence is further illustrated and discussed with respect to FIG. 7 herein.

An association module 545 may annotate the document 555 with information based on the output of the selection module 535. In XML, this annotation typically consists of enclosing the identifiers in a predefined XML tag, e.g.

<CSI>1234546</CSI. Alternatively, if the text fragmenter 520 created fragments corresponding to existing XML nodes, e.g. <LINE> nodes, then it is possible to annotate these nodes with an XML attribute, e.g. <LINE CSI="123456"> . . . </LINE>. Alternatively, or additionally, the association module 545 may implement another automated process, such as removal of the identified fragments which comprise the selected sequence. Optionally, a verification module 540 implements verification steps to confirm the previously identified normalized identifiers and/or identify additional normalized identifiers. If identifiers are supposed to comply to some standard, then it is possible to verify this at this step. Non-complying identifiers may be eliminated, or for instance tagged as suspicious, for a subsequent manual inspection. Alternatively, it is possible to compute a standard compliance metric for the document so as to perform a global quality assurance on the converted document, which can in turn be rejected (due to a failed Quality Assurance check). Additionally, if several best sub-sequences have been identified, a standard compliance metric may be applied to select the best among them.

Each of the processing modules 515, 520, 530, 535, 545 and 545 may execute instructions for performing the exemplary method described in greater detail below, which may be stored in associated memory 550. Text fragments, documents, identified sequences, rules defining numbering schemes, and the like may also be stored in memory 550. The memory 550 may represent any type of computer readable medium such as random access memory (RAM), read only memory (ROM), magnetic disk or tape, optical disk, flash memory, or holographic memory. In some embodiments, the processing modules 515, 520, 530, 535, 545, 545 and memory 550 may be combined in a single chip.

Figure 6:
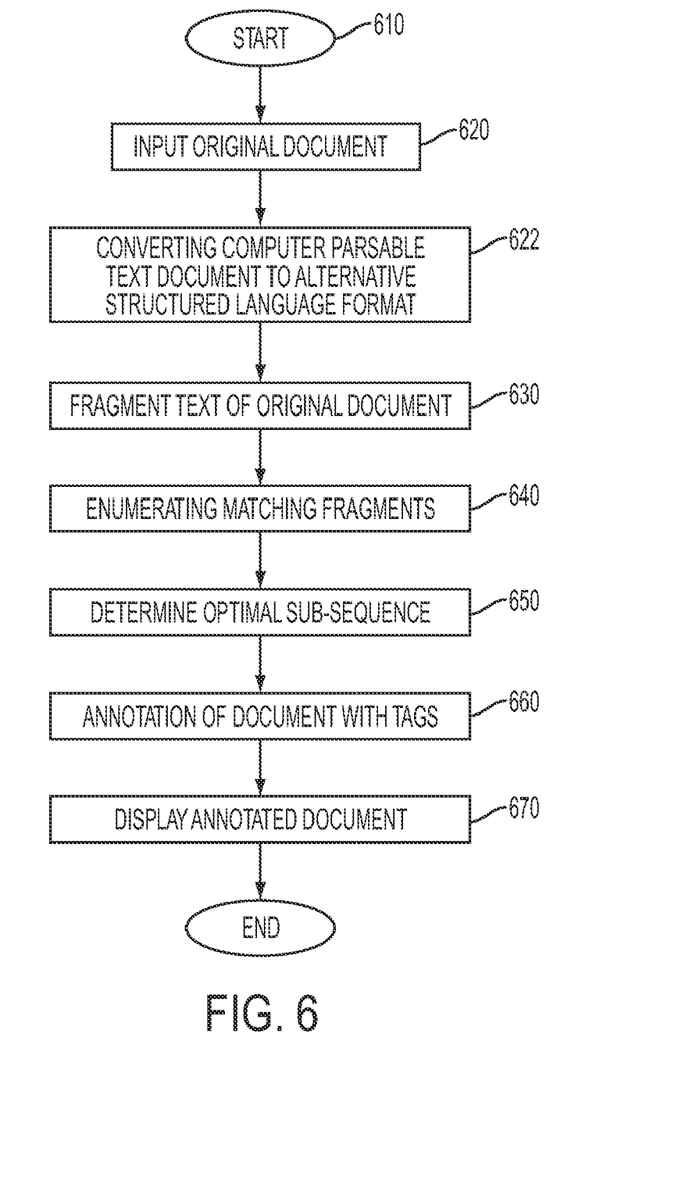
FIG. 6 is a flowchart illustrating an example embodiment of a method for recognition of an ordered sequence of identifiers in a document.

Turning now to FIG. 6, the flowchart illustrates an example embodiment of the method for structuring documents utilizing recognition of an ordered sequence of identifiers. The method may be implemented in a computer program product that may be a tangible computer-readable recording medium on which a control program is recorded, or may be a transmittable carrier wave in which the control program is embodied as a data signal, to be executed on a computer. The illustrated method may be entirely automated or may include some user input, as noted herein.

Initially, an operator navigates to the document conversion user interface at 610. At 620, an original document is converted to a structured format. The converted document is fragmented into text fragments at 630. Depending on the nature of the document, the text fragments may be a line of text, a portion of a line, or a single word. To spot the desired identifiers, one or several regular expressions may be written to find the possible occurrences of the desired identifiers. To identify the document portions describing each object (the subject of each identifier), it is assumed that the objects are described in the document in an order induced by the identifier.

At 640 all plausible identifiers are enumerated using some large regular expression(s) to obtain a sequence of identifiers, before looking for the longest sub-sequence of identifiers following a non-strict monotonic increase. All tokens matching a certain pattern, for instance expressed as a regular expression, are enumerated. For the example of CSI numbers, we can use a regular expression matching a series of 5 to 6 digits, possibly separated by a white character. In certain syntax, this can be written [0-9]\s?[0-9]\s?[0-9]\s?[0-9]\s?[0-9]\s?[0-9]?\s?. Further variations may be envisioned by those skilled in the art to comply with other specificities. Any such matching token or fragment is defined as a 'term' for the purposes herein. This results in an ordered sequence of terms.

Several tokenizations of the document contents may be utilized. One approach is to read the document line by line and enumerate all matching substrings in the line. Each matching substring is deemed to be a potential identifier and is accumulated in an ordered sequence of so-called terms. The optimal sub-sequence, the longest non-strictly increasing sub-sequence, of terms is determined at 650. The terms of the longest sub-sequence are deemed to belong to the portion of the document describing the corresponding objects. Any other occurrence of such term is deemed to be a reference to the object.

Identifying the longest sub-sequence is done recursively from the beginning of the ordered sequence to its end. In one embodiment, a weight is associated to each term, for example, 1. A score function is defined for a sub-sequence, typically the sum of the weight of its terms. A compare function is defined for any pair of terms, in order to compare two terms so as to order terms, typically the natural lexicographic order, since the identifier is probably meaningful to a user. A special starting term $T_0$ is inserted at the head of the sequence, with a score of 0. This term is lower than any other term by construction. The best increasing sub-sequence is computed in $N*(N+1)/2$ steps, where N is the number of enumerated terms. For each term $T_i$ (i=1 . . . N), the best achievable score and the best previous corresponding term are recorded by looking in turn at the best result achieved for each of the previous i–1 terms. When this data structure has been constructed the term with the highest score is identified and the corresponding sub-sequence is obtained by backward chaining. This process is further illustrated and discussed with respect to FIG. 7 herein.

At 660 the document or document pages are annotated with XML tags comprising information derived from the assigned terms, defined as those associated with the longest sub-sequence. The annotation of document pages with XML tags is described above with respect to the discussion of association module 545 in FIG. 5. The annotated document is displayed at 670.

It will be appreciated that further processing steps may be performed on the structured document, in addition to those described, such as identification of chapter headings and/or subheadings and annotating the document with tags corresponding to the headings and/or indexing the headings according to the page numbers of the original document, displaying a table of contents according to the page numbers of the original document, and the like.

Figure 7:
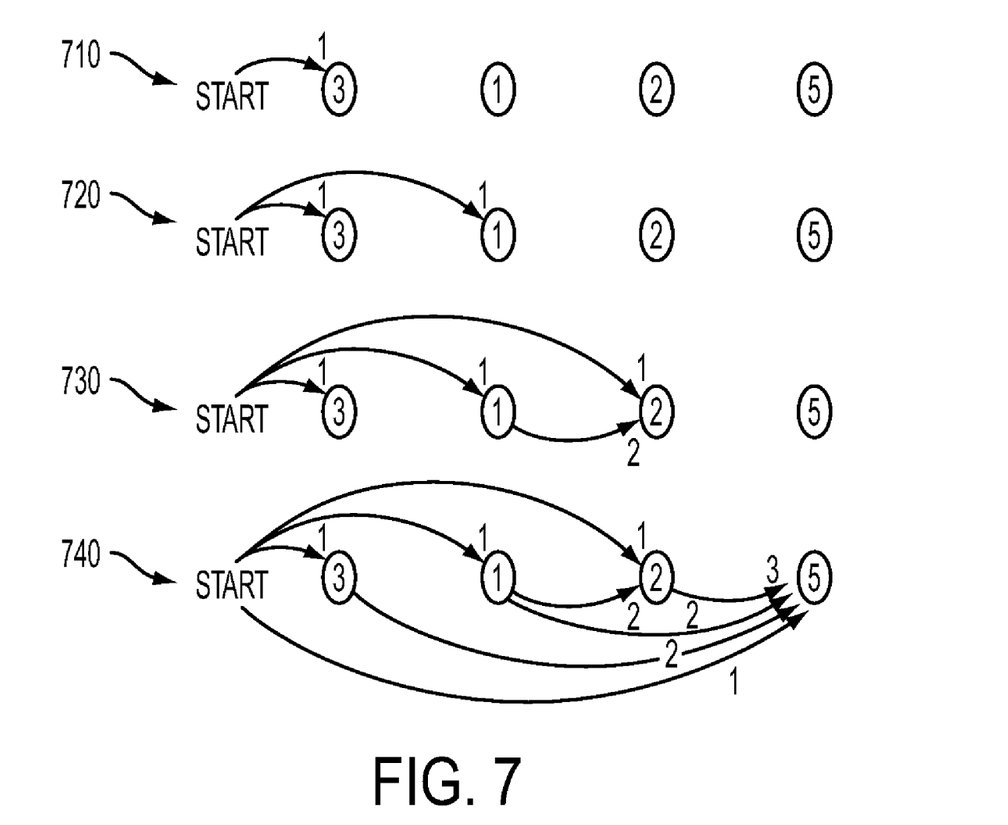
FIG. 7 illustrates operation of the method for determination of the optimal sub-sequence.

Referring now to FIG. 7, the diagram illustrates an example embodiment for identifying the longest increasing sub-sequence. It is assumed for the purposes of this illustration that four terms have been enumerated ['3', '1', '2', '5']. At 710 a first iteration is performed, for which the only possibility consists in selection of the term '3'. A second iteration is performed at 720. In this case the only possibility for the second term consists in selecting it alone, since '3' is greater than '1'. At the third iteration (730), there are two possible previous terms for term '2'. Linking from the term '1' yields a better score of 2. At the fourth iteration (740), the best score achievable with a sub-sequence including the term '5' is the sub-sequence ['1', '2', '5'] with a score of 3. The weight attributed to each token can be constant or computed according to some heuristics. For example, the weight can be higher for isolated tokens than for tokens close to each other.

Figure 8:
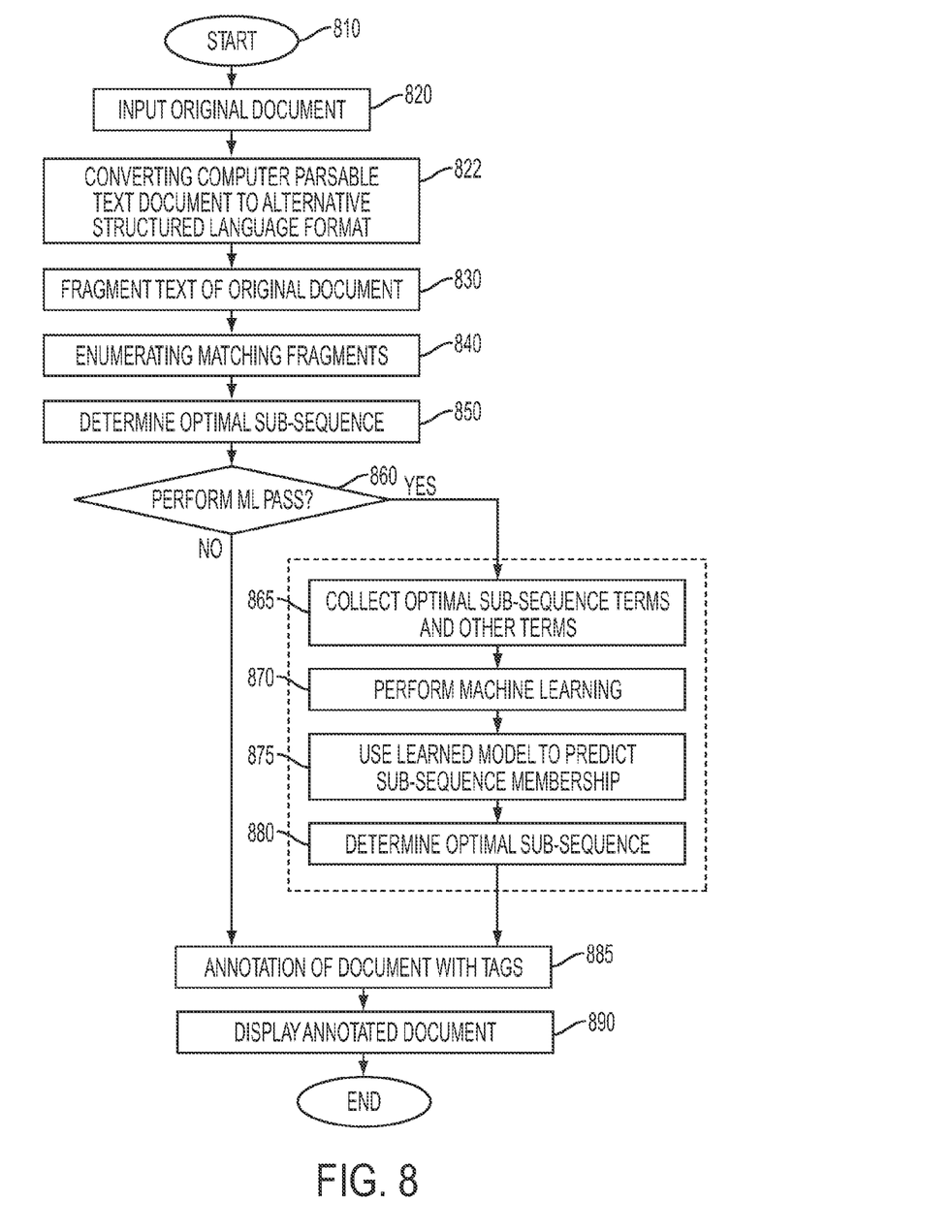
FIG. 8 is a flowchart illustrating another example embodiment of a method for recognition of an ordered sequence of identifiers in a document.

The method discussed with respect to FIG. 6 exploits a certain pattern and a monotonic increase constraint. It is possible to exploit other aspects of the identifiers to be recognized, such as their position on the page, their typography, and their position relative to other textual content on the page, among various aspects. One embodiment for exploiting these alternate aspects is illustrated in FIG. 8, which utilizes a statistical machine learning technique to exploit this information.

In this example embodiment, the method is performed as described with reference to FIG. 6, with 810, 820, 830, 840, and 850 corresponding to 610, 620, 630, 640, and 650, respectively. At 860, a determination is made whether to perform machine learning. If machine learning is not desired, the document is annotated with tags at 885 and the annotated document is displayed at 890. If machine learning is desired, the optimal sub-sequence terms and other terms are collected at 865. At 870 machine learning is performed, with the training set for training the binary classifier constituted of positive elements taken from the set of terms elected in the optimal sequence when matching fragments are enumerated at 840. Negative elements are taken from the set of terms not elected when the optimal sub-sequence is determined at 850. Optionally, it is possible to select additional negative elements from the set of non-matching tokens in the document. Using this binary classifier, the category of all enumerated terms is predicted and the prediction is associated as a weight for each term at 875. The computation of the longest increasing sub-sequence is again performed at 880 with the new weights. With this enhancement to the method, a typographic and/or positional regularity can be learned so as to improve the quality of the result. At 885 the document is annotated with XML tags comprising information derived from the assigned terms. At 890 the annotated document is displayed with some or all of the terms on the digital document.

While the present discussion has been illustrated and described with reference to specific embodiments, further modification and improvements will occur to those skilled in the art. Additionally, "code" as used herein, or "program" as used herein, is any plurality of binary values or any executable, interpreted or compiled code which can be used by a computer or execution device to perform a task. This code or program can be written in any one of several known computer languages. A "computer", as used herein, can mean any device which stores, processes, routes, manipulates, or performs like operation on data. It is to be understood, therefore, that this disclosure is not limited to the particular forms illustrated and that it is intended in the appended claims to embrace all alternatives, modifications, and variations which do not depart from the spirit and scope of the embodiments described herein.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

What is claimed is:

1. A method for operating a computing device to create a document structure model of a computer parsable text document utilizing recognition of at least one ordered sequence of identifiers in the document, the method comprising:

navigating to a document conversion graphical user interface;

converting at least one computer parsable text document of any format to an alternative structured language format to form a converted document;

fragmenting the text of said converted document, wherein fragmenting comprises breaking said converted document into an ordered sequence of text fragments within a text format;

enumerating said text fragments to obtain a sequence of terms, wherein each said term comprises a matching fragment;

identifying at least one optimal sub-sequence of terms, wherein said optimal sub-sequence comprises at least one longest increasing sub-sequence from among said sequence of terms;

annotating the computer parsable text document with tags, wherein said tags comprise information derived from identification of said at least one optimal sub-sequence; and displaying said annotated document on said graphical user interface.

2. The method according to claim 1, wherein said alternative structured language comprises a markup language.

3. The method according to claim 2, wherein said markup language includes at least one member selected from the group consisting of XML, SGML, and HTML.

4. The method according to claim 1, wherein said text fragments include at least one member selected from the group comprising at least one line of text, a portion of a line of text, and a single word.

5. The method according to claim 1, wherein fragmenting further comprises effecting a position allocation of said converted document text content to preserve page segmentation and vertical positions per page of said text content.

6. The method according to claim 5, wherein said position allocation for a plain text format comprises a line number.

7. The method according to claim 5, wherein said position allocation for a proprietary format is obtained by converting said proprietary format into a format in which information about vertical position is present.

8. The method according to claim 1, wherein enumerating comprises comparing said text fragments to a specified pattern to identify at least one matching fragment.

9. The method according to claim 1, wherein identifying said at least one optimal sub-sequence comprises:

associating a weight with each term;

defining a scoring function for a sub-sequence;

defining a compare function for any pair of said terms;

inserting a starting term at the head of said sequence of terms;

computing the term with the highest score; and identifying a corresponding sub-sequence.

10. The method according to claim 1, wherein identifying said at least one optimal sub-sequence comprises applying a standard compliance metric to select from among several identified best sub-sequences.

11. The method according to claim 1, further comprising:
   determining whether to perform machine learning upon identification of said at least one optimal sub-sequence;
   if machine learning is elected,
      collecting said optimal sub-sequence and other terms;
      specifying a training set for training a binary classifier;
      predicting the category of all enumerated terms;
      associating a category weight for each of said enumerated terms, said weight comprising the predicted category of each of said enumerated terms; and
      computing the longest increasing sub-sequence.

12. The method according to claim 11, wherein said training set comprises positive elements taken from the set of terms elected in said optimal sequence when matching fragments are enumerated and negative elements taken from the set of terms not elected when said optimal sequence is determined.

13. A computing system for creating a document structure model of a computer parsable text document utilizing recognition of at least one ordered sequence of identifiers in the document, the system comprising:
   a document conversion graphical user interface;
   a conversion processor for converting at least one computer parsable text document of any format to an alternative structured language format to form a converted document;
   a text fragmenter for fragmenting the text of said converted document, wherein fragmenting comprises breaking said converted document into an ordered sequence of text fragments within a text format;
   an enumeration module for enumerating said text fragments to obtain a sequence of terms, wherein each said term comprises a matching fragment;
   a selection module for identifying at least one optimal sub-sequence of terms, wherein said optimal sub-sequence comprises at least one longest increasing sub-sequence from among said sequence of terms; and
   an association module for annotating the computer parsable text document with tags, wherein said tags comprise information derived from identification of said at least one optimal sub-sequence.

14. The system according to claim 13, wherein said alternative structured language comprises a markup language.

15. The system according to claim 14, wherein said markup language includes at least one member selected from the group consisting of XML, SGML, and HTML.

16. The system according to claim 13, wherein said text fragments include at least one member selected from the group comprising at least one line of text, a portion of a line of text, and a single word.

17. The system according to claim 16, wherein fragmenting further comprises effecting a position allocation of said converted document text content to preserve page segmentation and vertical positions per page of said text content.

18. The system according to claim 17, wherein said position allocation for a plain text format comprises a line number.

19. The system according to claim 17, wherein said position allocation for a proprietary format is obtained by converting said proprietary format into a format in which information about vertical position is present.

20. The system according to claim 13, wherein enumerating comprises comparing said text fragments to a specified pattern to identify at least one matching fragment.

21. The system according to claim 13, wherein identifying said at least one optimal sub-sequence comprises:
   associating a weight with each term;
   defining a scoring function for a sub-sequence;
   defining a compare function for any pair of said terms;
   inserting a starting term at the head of said sequence of terms;
   computing the term with the highest score; and
   identifying a corresponding sub-sequence.

22. The system according to claim 13, wherein identifying said at least one optimal sub-sequence comprises applying a standard compliance metric to select from among several identified best sub-sequences.

23. The system according to claim 13, further comprising:
   means for determining whether to perform machine learning upon identification of said at least one optimal sub-sequence;
   if machine learning is elected,
      means for collecting said optimal sub-sequence and other terms;
      means for specifying a training set for training a binary classifier;
      means for predicting the category of all enumerated terms;
      means for associating a category weight for each of said enumerated terms, said weight comprising the predicted category of each of said enumerated terms; and
      means for computing the longest increasing sub-sequence.

24. The system according to claim 23, wherein said training set comprises positive elements taken from the set of terms elected in said optimal sequence when matching fragments are enumerated and negative elements taken from the set of terms not elected when said optimal sequence is determined.

25. A computer-readable storage medium having computer readable program code embodied in said medium which, when said program code is executed by a computer causes said computer to perform method steps for creating a document structure model of a computer parsable text document utilizing recognition of at least one ordered sequence of identifiers in the document, the method comprising:
   navigating to a document conversion graphical user interface;
   converting at least one computer parsable text document of any format to an alternative structured language format to form a converted document;
   fragmenting the text of said converted document, wherein fragmenting comprises breaking said converted document into an ordered sequence of text fragments within a text format;
   enumerating said text fragments to obtain a sequence of terms, wherein each said term comprises a matching fragment;
   identifying at least one optimal sub-sequence of terms, wherein said optimal sub-sequence comprises at least one longest increasing sub-sequence from among said sequence of terms;
   annotating the computer parsable text document with tags, wherein said tags comprise information derived from identification of said at least one optimal sub-sequence; and
   displaying said annotated document on said graphical user interface.

\* \* \* \* \*